US010889347B2

(12) United States Patent
    Allen

(10) Patent No.: US 10,889,347 B2
(45) Date of Patent: Jan. 12, 2021

(54) PERSONAL TRANSPORT VEHICLE

(71) Applicant: NantMobility, LLC, Culver City, CA (US)

(72) Inventor: Nathan Howard Allen, Pasadena, CA (US)

(73) Assignee: NantMobility, LLC, Culver City, CA (US)

( * ) Notice: Subject to any disclaimer, the term of this patent is extended or adjusted under 35 U.S.C. 154(b) by 80 days.

(21) Appl. No.: 16/501,471

(22) Filed: Dec. 15, 2014

(65) Prior Publication Data
US 2020/0231240 A1 Jul. 23, 2020
US 2020/0385081 A9 Dec. 10, 2020

Related U.S. Application Data

(60) Provisional application No. 61/916,094, filed on Dec. 13, 2013, provisional application No. 61/963,883, filed on Dec. 16, 2013.

(51) Int. Cl.
| B62K 11/00 | (2006.01) |
| B62K 21/12 | (2006.01) |
| B62K 21/18 | (2006.01) |
| B62K 23/06 | (2006.01) |
| B62L 1/02 | (2006.01) |
| B62H 5/00 | (2006.01) |
| B62M 6/60 | (2010.01) |
| B62J 45/00 | (2020.01) |
| B62K 15/00 | (2006.01) |

(52) U.S. Cl.
CPC ............... *B62K 11/00* (2013.01); *B62H 5/00* (2013.01); *B62J 45/00* (2020.02); *B62K 15/006* (2013.01); *B62K 21/12* (2013.01); *B62K 21/18* (2013.01); *B62K 23/06* (2013.01); *B62L 1/02* (2013.01); *B62M 6/60* (2013.01); *B62K 2202/00* (2013.01)

(58) Field of Classification Search
CPC ........ B62K 11/00; B62K 21/12; B62K 21/18; B62K 23/06; B62K 15/006; B62K 2202/00; B62J 45/00; B62L 1/02; B62H 5/00; B62M 6/60
See application file for complete search history.

(56) References Cited

U.S. PATENT DOCUMENTS 3,897,842 A * 8/1975 Rheaume ............... B62D 37/04
                                              180/219
4,007,614 A * 2/1977 Schott .................... B62H 5/003
                                              70/234
(Continued)

OTHER PUBLICATIONS

U.S. Appl. No. 16/441,706, filed Jun. 14, 2019, Nathan Howard Allen.

*Primary Examiner* — Drew J Brown
(74) *Attorney, Agent, or Firm* — Harness, Dickey & Pierce, P.L.C.

(57) ABSTRACT

A personal transport vehicle capable of staying upright without the need for a stand by incorporating tires having an advantageous design combined with an overall lowered center of gravity. The personal transport vehicle further incorporating a hub and steering assembly configured within the front wheel of the vehicle, as well as a brake and propulsion means configured within the rear wheel of the vehicle. Finally, the personal transport vehicle is capable of being folded into a compact configuration, lending itself to ease of shipment, storage and transport.

21 Claims, 13 Drawing Sheets

(56) References Cited

U.S. PATENT DOCUMENTS

| | | | | |
|---|---|---|---|---|
| 4,379,393 | A * | 4/1983 | Schott | B62H 5/003 |
| | | | | 70/234 |
| 4,522,281 | A * | 6/1985 | Snider | B62K 5/01 |
| | | | | 180/208 |
| 5,265,695 | A * | 11/1993 | Piazzi | B62K 3/002 |
| | | | | 180/208 |
| 6,505,846 | B1 * | 1/2003 | Hoffman | B62H 5/003 |
| | | | | 280/274 |
| 8,776,932 | B1 * | 7/2014 | Bussinger | B62K 15/006 |
| | | | | 180/208 |
| 9,051,019 | B2 * | 6/2015 | Reck | B62K 7/04 |
| 9,440,698 | B2 * | 9/2016 | Dadoosh | H02J 7/0042 |
| D774,961 | S | 12/2016 | Allen | |
| 9,873,476 | B2 * | 1/2018 | Etzelsberger | B62J 1/04 |
| 2003/0102647 | A1 * | 6/2003 | Morrone | B62H 5/142 |
| | | | | 280/281.1 |
| 2005/0269793 | A1 * | 12/2005 | Mackin | B62J 1/00 |
| | | | | 280/87.041 |
| 2006/0266570 | A1 * | 11/2006 | Roth | B62K 3/002 |
| | | | | 180/208 |
| 2009/0020350 | A1 * | 1/2009 | Wu | B62K 15/008 |
| | | | | 180/208 |
| 2011/0298193 | A1 * | 12/2011 | Fan | B62K 15/006 |
| | | | | 280/221 |
| 2012/0193159 | A1 * | 8/2012 | Wu | B62K 5/007 |
| | | | | 180/208 |
| 2014/0203538 | A1 * | 7/2014 | Huang | B62K 3/00 |
| | | | | 280/639 |
| 2015/0068828 | A1 * | 3/2015 | Delgatty | B62J 7/04 |
| | | | | 180/210 |
| 2017/0001683 | A1 * | 1/2017 | Gerencser | B62K 3/002 |
| 2018/0015978 | A1 * | 1/2018 | Delgatty | B62K 11/02 |
| 2018/0022411 | A1 * | 1/2018 | Kistemaker | B62K 21/00 |
| | | | | 180/208 |

* cited by examiner

PERSONAL TRANSPORT VEHICLE

CROSS-REFERENCE TO RELATED APPLICATIONS

This application claims the benefit of, and priority to, U.S. Provisional Patent Application No. 61/916,094, filed Dec. 13, 2013, and U.S. Provisional Patent Application No. 61/963,883, titled Electric Scooter and filed Dec. 16, 2013.

FIELD OF THE INVENTION

The invention relates generally to a personal transport vehicle for use in urban and localized districts. In particular, the present invention relates to a two-wheeled personal transport vehicle capable of staying upright without the need for a stand or other device creating a tripod for the vehicle. Specifically, the large contact patch created by the tires of the vehicle, combined with an overall lowered center of gravity, allows the two-wheeled vehicle to stay upright. In addition, the invention pertains to a two-wheeled personal transport vehicle incorporating a hub and steering device configured within the wheel of the vehicle. Furthermore, the inventive vehicle incorporates a constraint device (brake) and propulsion device (motor) configured within the wheel of the vehicle. In addition, the two-wheeled personal transport vehicle is capable of being folded into a compact configuration, lending itself to ease of shipment, storage and transport.

BACKGROUND ART

The desire for new and innovative forms of transportation is an ongoing pursuit of modern man. Some of the challenges of designing vehicles revolve around high energy-efficiency and practicality, while maintaining good usability and utility. Aesthetic design and user fun factor is also a part of the equation and sometimes offsets utility and/or performance in the vehicle. However atop the list is the marriage of design, function and innovation, the hallmarks of the present invention.

Personal transportation vehicles such as scooters, mopeds and motorcycles have seen little to no advancement in the modern era. The advent and focus on mass-transit and automobiles have left personalized vehicles unchanged and created an innovation void in this space. Whatever innovation has spawned, has been directed towards vehicles like the Segway® and similar variants. In addition, the current direction of development for two-wheeled vehicles has placed emphasis on additional functionality and multi-tasking, wherein the present invention focuses on simplicity and efficiency.

Accordingly, there exists a need for a personalized vehicle incorporating innovative and progressive functions, while complimenting a simple and elegant design. By incorporating the inventive solutions taught herein, the present invention has spawned a new and useful personal transport vehicle, addressing the thirst for innovative solution in the segment.

SUMMARY OF THE INVENTION

Various embodiments of the present invention will undoubtedly find utility in society. For example, in one embodiment the present invention teaches a personal transport vehicle comprising a frame for providing structural support to the vehicle, a front wheel and rear wheel, upon which the frame is attached, and a steering assembly confined within the confines of the front wheel of the vehicle. The steering assembly is configured inside the front wheel to provide protection to the steering components, and to allow for ease of disassembly and transport of the vehicle. In addition, by packing all of the steering components into the wheel of the vehicle, the personal transport vehicle provides a seamless and efficient design dynamic. The steering assembly comprises a spindle rotatably attached to the frame, and a steering arm affixed to the spindle. The spindle in configured to rotate about the frame in the about vertical axes, allowing for the steering of the personal transport vehicle by rotating the steering arm.

The low center of gravity of the vehicle allows for self-balancing of the two-wheeled vehicle, without the need for a stand. Aided by the large diameter tires, the vehicle is able to stay upright while stationary, which further aids in driveability of the vehicle.

In various embodiments, the personal transport vehicle may further include a rear seat, which may also be rotated similar to the steering arm, to aid in packaging, storing and transporting the vehicle.

In various embodiments, the vehicle may be powered by an electric or gas-powered motor, or similar propulsion device(s). In such embodiments, the motor be entirely configured within the confines of the rear wheel, protecting the motor and related accessories, as well as advancing the seamless and fluid design element of the vehicle. Power supplies of the motor, whether it be gas or batteries, may be hidden in the frame of the vehicle, specifically in the platform housing.

In yet additional embodiments, the vehicle may further incorporate a brake device, comprising a brake disc and a brake caliper, for frictional deceleration of the vehicle.

The present invention also teaches a personal transport vehicle comprising a frame for providing structural support to the vehicle, a front wheel and rear wheel, upon which the frame is attached, and a steering assembly. The frame is configured for attachment to the front wheel with a single arm, and configured to attach to the rear wheel with a single arm, such that the frame attaches to the front wheel and rear wheel on the same side of the vehicle, such that the opposing sides of both the front wheel and the rear wheel are free from any structural support. Furthermore, the steering assembly is attached to the vehicle on a single side of the vehicle, either the same side as the frame, or the opposing side.

In addition, the present invention discloses a personal transport vehicle comprising a frame, a front wheel and a rear wheel, wherein, the center of gravity of the vehicle is substantially below the straight line connecting the centerline of the front wheel with the centerline of the rear wheel, and wherein the steering arm is folded to lay about parallel to the frame, and the seating arm is folded to lay about parallel to the frame, such that in the folded configuration, the vertical and horizontal parameters of the vehicle are created by front wheel and rear wheel.

For a better understanding of the structure of the Personal Transport Vehicle and its function, detailed explanations are given below with reference to the attached drawings. The Personal Transport Vehicle is not limited, however, to the particular arrangement portrayed in the subject drawing figures.

BRIEF DESCRIPTION OF THE DRAWINGS

These and other features of this invention will be more readily understood from the following detailed description of the various aspects of the invention taken in conjunction with the accompanying drawings in which.

The attached drawings are merely schematic representations, not intended to portray specific parameters of the invention. Furthermore, the attached drawings are intended to depict only typical embodiments of the invention, and therefore should not be considered as limiting the scope of the invention. In the attached drawings, like numbering represents like elements.

DETAILED DESCRIPTION OF THE INVENTION

The present invention discloses a personal transport vehicle for use in urban and localized districts. In particular, the present invention teaches a two-wheeled personal transport vehicle capable of staying upright on two wheels by incorporating the large contact patches created by the tires of the vehicle, in combination with an overall center of gravity that lies below the centerline of the wheels. This arrangement produces a very stable two-wheeled vehicle, undoubtedly due to it's self-balancing characteristic. Additionally, the present invention discloses a hub and steering assembly confined within the front wheel of the vehicle, thus protecting functional components of the vehicle, and allowing for a sleeker and more aerodynamic design. Furthermore, the inventive vehicle incorporates a constraint device (brake) and propulsion device (motor) configured within the rear wheel of the vehicle. As before, this advent allows for protection of components of the vehicle, as well as increased aerodynamic efficiency and greater freedom for designing the aesthetics of the vehicle.

Finally, by configuring functional elements of the vehicle within the confines of the front and rear wheels, the two-wheeled personal transport vehicle is capable of being folded into a compact configuration, lending itself to ease of shipment, storage and transport.

Figure 1:
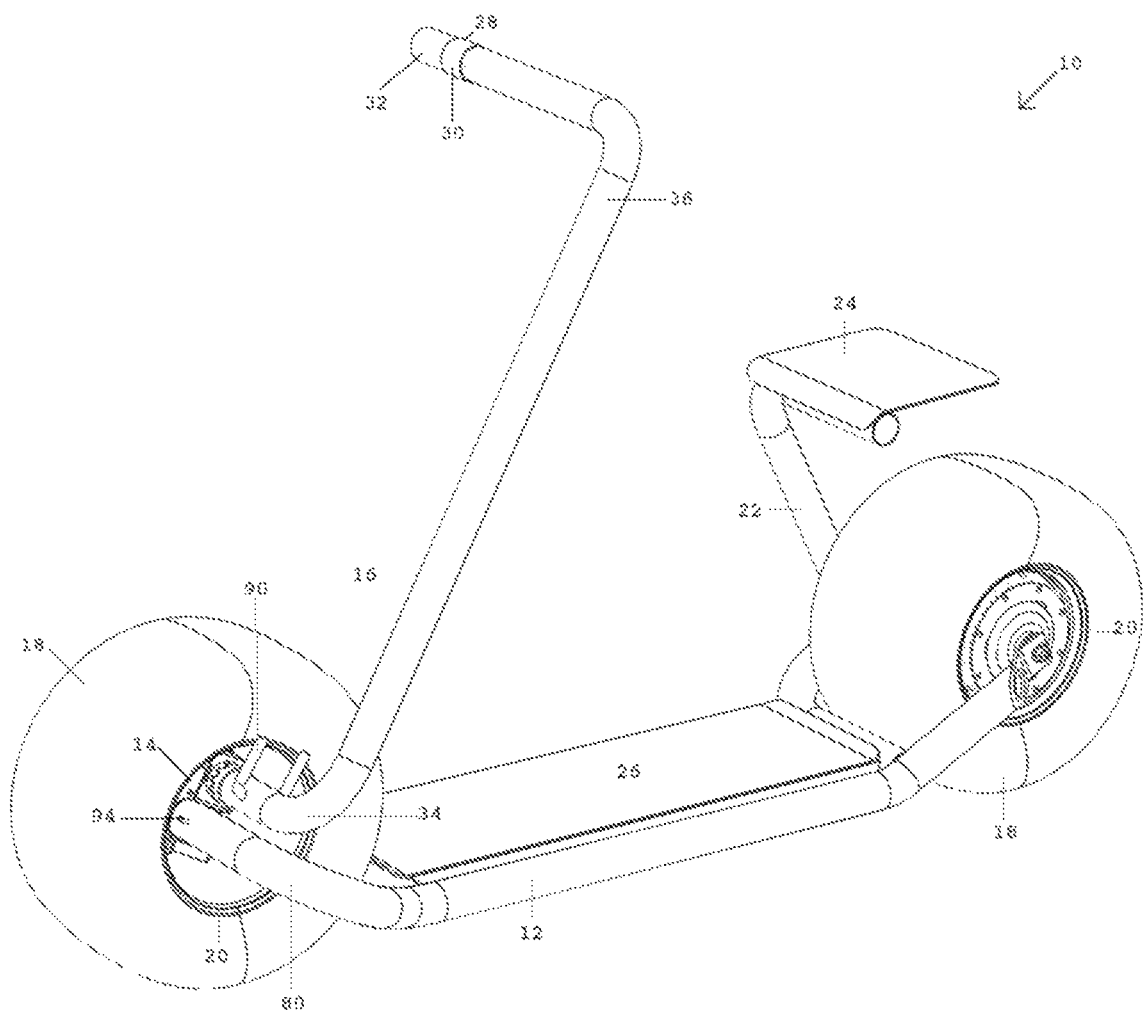
FIG. 1 provides a perspective view of the Personal Transport Vehicle in the assembled configuration in accordance with an embodiment or portion of an embodiment of the present invention.

Referring now to the Figures. FIG. 1 provides a perspective view of the Personal Transport Vehicle 10 in accordance with an embodiment or portion of an embodiment of the present invention, wherein the Personal Transport Vehicle 10 is shown in it's assembled configuration with the steering arm 16 and seating arm 22 in the upright and ready positions. In addition, FIG. 1 depicts the frame 12 of the vehicle, which may be composed of any suitable material or combination of materials, including metals, alloys (including steel, carbon, aluminum, titanium, etc.) carbon fiber, fiberglass, plastics, plastic composites, resins, impregnated foam, combinations therefrom, and derivatives thereof. In the present embodiment, the frame comprises a hollow, steel tube design. FIG. 1 also displays the front and rear wheels 20 and tires 18 of the vehicle 10. Also shown are the vehicle controls 28, found at the distal end 36 of the steering arm 16, consisting of the throttle lever 30 and brake lever 32. Although mechanical vehicle controls, such as levers, have been disclosed, it is understood that any device, including electronic devices, capable or intended for performing similar functions are claimed under this invention, including, but not limited to, drive-by-wire, mechanical controls (push to go; twist throttle; etc.) and other similar devices. FIG. 1 also depicts a passenger seat 24, for accommodating an end user in the seated position, as well as a platform 26 for accommodating an end user's feet.

The frame 12 may comprise of one or multiple pieces assembled together. The frame 12 may be constructed from a number of appropriate materials and combination of materials, including, but not limited to, metals, alloys (including steel, carbon, aluminum, titanium, etc.) carbon fiber, fiberglass, plastics, plastic composites, resins, impregnated foam, combinations therefrom, and derivatives thereof. Various methods for manufacturing the frame 12 may be incorporated, including, but not limited to, welding, brazing, extruding, cnc, injection molding, flow forming, thermal curing, casting, combinations therefrom, and derivatives thereof. In the present embodiment, two variants of the frame have been provided for exemplary purposes only.

FIG. 1 depict one exemplary embodiment of the frame 12, wherein the front end 80 of the frame 12 engages the front wheel 20 and front hub 40 (See FIG. 6) assembly on the same side as the proximal end 34 of the steering arm 16 engages the front wheel 20 and front hub 40. Furthermore, FIG. 1 depicts one exemplary embodiment, wherein the rear end 82 of the frame 12 engages the rear wheel 20 and rear hub 64 on both sides of the wheel 20 and rear hub 64. Alternative embodiments include engagement of the frame 12 on the same side as the front end 80 of the frame 12, and the proximal end 34 of the steering arm 16. In other words, the front end 80 of the frame 12 and the rear end 82 of the frame 12 engage their respective front hub 40 and rear hub 64 on the same side.

The frame 12 further provides a housing 38 configured along the length of the vehicle between the front and rear tire 18. The housing may be adapted for storage or confining components of the vehicle 10, including, fuel, fuel pumps, battery, electronic components, and the like. In one embodiment, the Personal Transport Vehicle 10 is configured for propulsion by an electric motor 66 (see FIG. 2a) situated in the rear wheel 20 of the vehicle 10. In said embodiment, the housing 38 may be used to confine batteries, chargers, power converters, and electronics relating to the consumption, charging and discharging of electronic power.

Figure 2A:
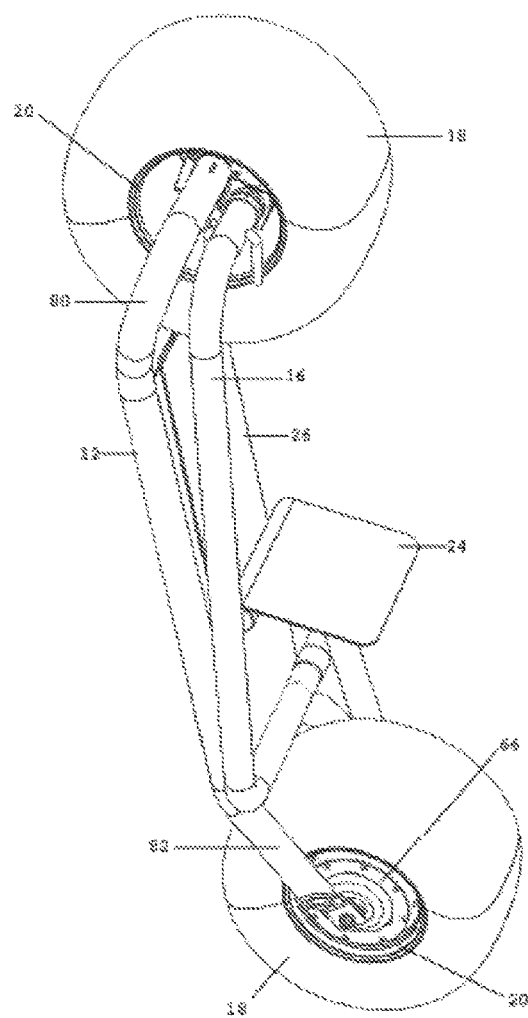
FIGS. 2a and 2b depict a perspective view of the Personal Transport Vehicle in the folded configuration in accordance with an embodiment or portion of an embodiment of the present invention.
Figure 2B:
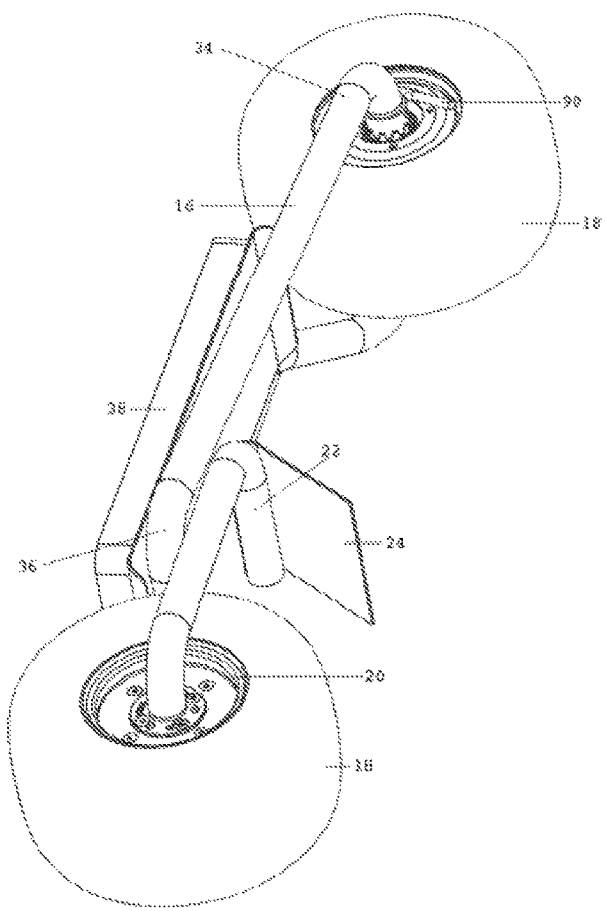

FIGS. 2a and 2b depict perspective views of the Personal Transport Vehicle 10 in the folded configuration in accordance with an embodiment or portion of an embodiment of the present invention. FIGS. 2a and 2b illustrate the folded configurations of the vehicle 10 detailed in FIG. 1, wherein the steering arm 16 is folded downwards from the front hub 40 to lay adjacent to the frame 12, and the seating arm 22 is folded downwards from the rear hub 64 to lay adjacent to the frame 12. In these folded configurations, the perimeter of the vehicle 10 is vertically confined within the outer diameter of the tires 18, thus creating a compact and protected state for storing and transporting the vehicle 10. FIGS. 2a and 2b differ in the arrangement of attachment of the steering arm 16, frame 12 and seating arm 22, with respect to the front wheel 20 and rear wheel 20.

Figure 3:
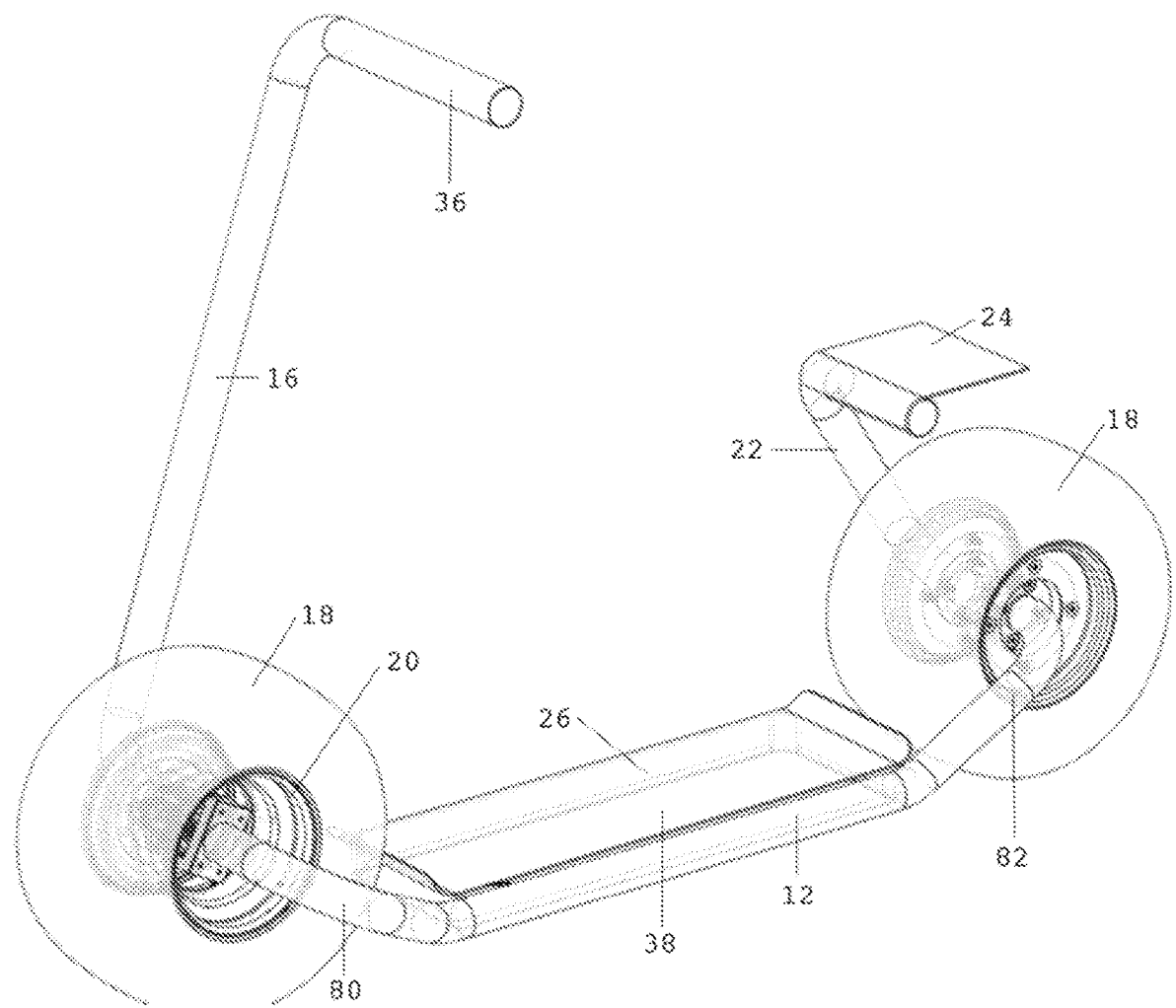
FIG. 3 depicts a perspective view of the Personal Transport Vehicle in the assembled configuration in accordance with an embodiment or portion of an embodiment of the present invention.

FIG. 3 depicts a second exemplary embodiment of the frame 12, wherein the front end 80 of the frame 12 engages the front wheel 20 and front hub 40 (See FIG. 6) assembly on the opposite side as the proximal end 34 of the steering arm 16 engages with the front wheel 20 and front hub 40. Furthermore, rear end 82 of the frame 12 engages the rear wheel 20 and rear hub 64 on the same side as the front end 80 of the frame 12. In other words, the front end 80 of the frame 12 and the rear end 82 of the frame 12 engage their respective front hub 40 and rear hub 64 on the same side.

In other embodiments, the steering arm 16 may engage the front wheel 20 and front hub 40 on the opposite or same side as the frame 12 engaging the front wheel 20 and front hub 40. Consequently, the seating arm 22 may also be configured to engage the rear wheel 20 and rear hub 64 on the opposite or same side as the frame 12 engaging the front wheel 20 and front hub 40.

Figure 4:
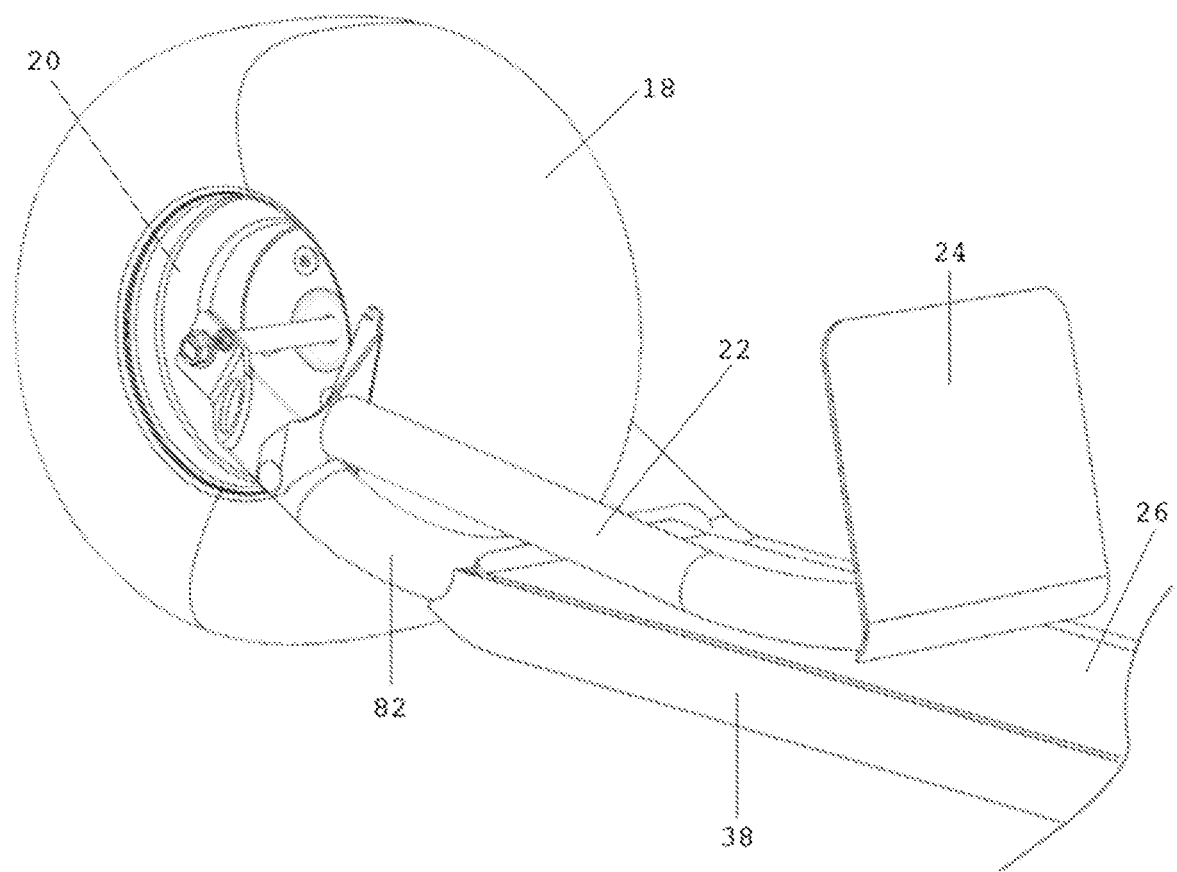
FIG. 4 depicts a perspective view of the Personal Transport Vehicle in the folded configuration in accordance with an embodiment or portion of an embodiment of the present invention.

FIG. 4 provides a perspective view of rear of the Personal Transport Vehicle in the folded configuration in accordance with an embodiment or portion of an embodiment of the present invention. The seating arm 22 is configured in the folded position, which is accomplished by releasing a quick lock mechanism (not shown). The quick lock mechanism for locking the seating arm 22 in the folded or upright position would be readily known to those with skill in the art, and include, a cam-lock, quick-release mechanism, friction lock, fasteners, and similar alternatives.

Figure 5:
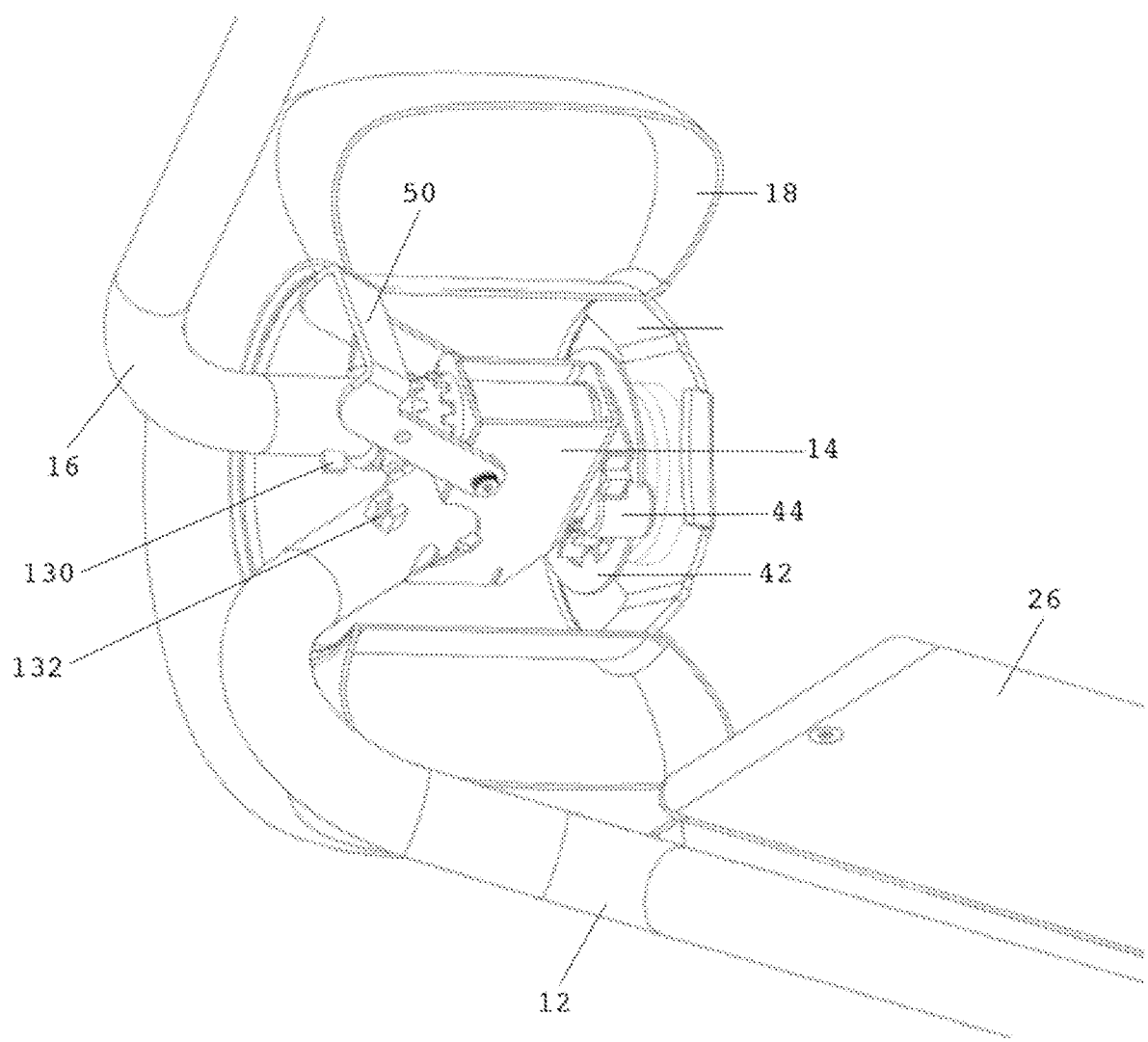
FIG. 5 depicts a perspective view of a front wheel of the Personal Transport Vehicle in accordance with an embodiment or portion of an embodiment of the present invention.
Figure 6:
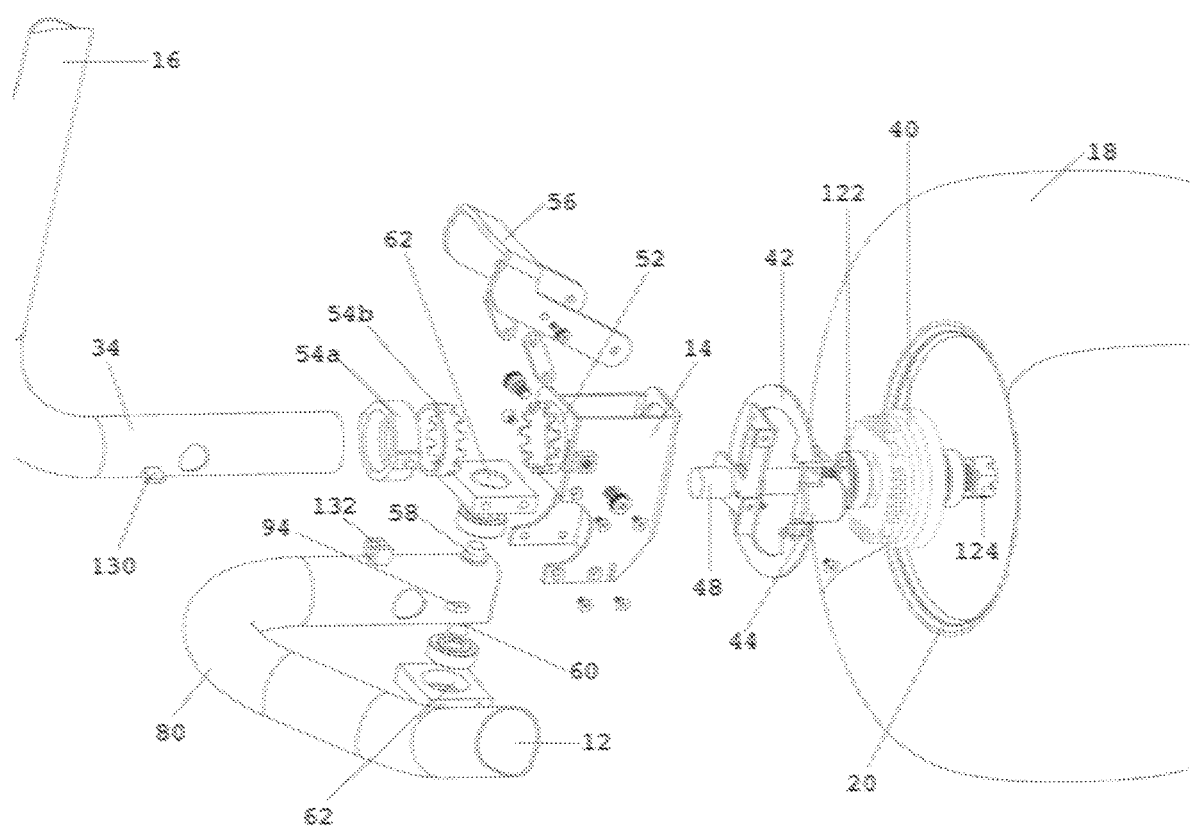
FIG. 6 depicts an exploded view of a front wheel of the Personal Transport Vehicle in accordance with an embodiment or portion of an embodiment of the present invention.

FIGS. 5 & 6 provide a detailed view of a front wheel 20 of the Personal Transport Vehicle 10 in accordance with an embodiment or portion of an embodiment of the present invention. FIG. 6 illustrates the front steering wheel 20 and hub 40 assembly in detail. As you can see, the front end 80 of the frame 12 is attached to a spindle 14 incorporating a steering axle attached to the frame 12. The steering axle 46 is mounted approximate to the vertical axis with an upper nub 58 and lower nub 60 protruding from the frame 12. The upper nub 58 and lower nub 60 of the steering axle 46 mate with upper and lower cavities 62 found in the spindle 14, attaching the frame 12 to the spindle 14. The nubs 58, 60 and cavities 62 are configured to allow for limited rotation of the spindle 14 about the axes created by the steering axle 46 (approximately vertical). In the depicted embodiment, the spindle 14 is comprised of multiple components, including an upper cavity 62 and lower cavity 62 assembled using fasteners to capture the frame in the spindle 14.

Depicted in FIG. 6 is the means for attaching the wheel 20 and front hub 40 to the spindle 14. The spindle 14 comprises a front axle 48 configured to protrude in a substantially horizontal axis, away from the spindle 14. The front axle 48 may accommodate the front hub 40 such that the front hub 40 is free to rotate about the front axle 48. The wheel 20 and tire 18 assembly are mounted to the hub 40 by conventional fasteners, thus allowing the hub 40, wheel 20 and tire 18 to freely rotate about the front axle 48. One or more bearings 100 may be incorporated to reduce rotational friction/resistance. The front axle 48 may also be configured to allow for incorporation of a friction braking system, incorporating a brake disc 42 and brake caliper 44. In such instance, the brake disc 42 is attached to the front hub 40, allowing for rotation about the front axle 48, and the brake caliper 44 may be affixed to the front axle 48, with or without the aid of additional brackets and fasteners.

Furthermore, FIG. 6 details the locking mechanism 50 used for selecting and/or reconfiguring the position of the steering arm 16. The locking mechanism 50 consists of a keyway 52 permanently affixed to the spindle 14, and a keyseat 54 rotationally coupled to the steering arm 16. The locking mechanism 50 further comprises a toggle arm 56 configured to detract the steering arm 16 from the spindle 14 in one configuration, and contract the steering arm 16 into the spindle 14 in the second configuration. Consequently, once a suitable position for the steering arm 16 is selected by the end user, the toggle arm 56 is positioned from the detracted configuration to the contracted configuration, thus engaging the keyway 52 with the keyseat 54 to lock the steering arm 16 to the spindle 14. In the depicted embodiment, the keyseat 54 comprises a two-piece system, incorporating a collar 54a rotatably attached to the key 54b. The key 54b is affixed to the front end 80 of the frame 12 such that rotating the steering arm 16 about the spindle 14 also rotates the key 54b. However, the collar 54a is rotatably attached to the key 54b, such that rotation of the steering arm 16 does not rotate the collar 54a. Thus the collar 54a remains true to the toggle arm 56, which is fixed to the spindle 14.

FIG. 6 also details the slot 130 and groove 132 used for confining the steering arm 16 in place, when in the folded configuration. The slot 130 is found on the steering arm 16, and aligns into the groove 132, found on the frame 12, when the steering arm 16 is folded down into the folded configuration.

Figure 7:
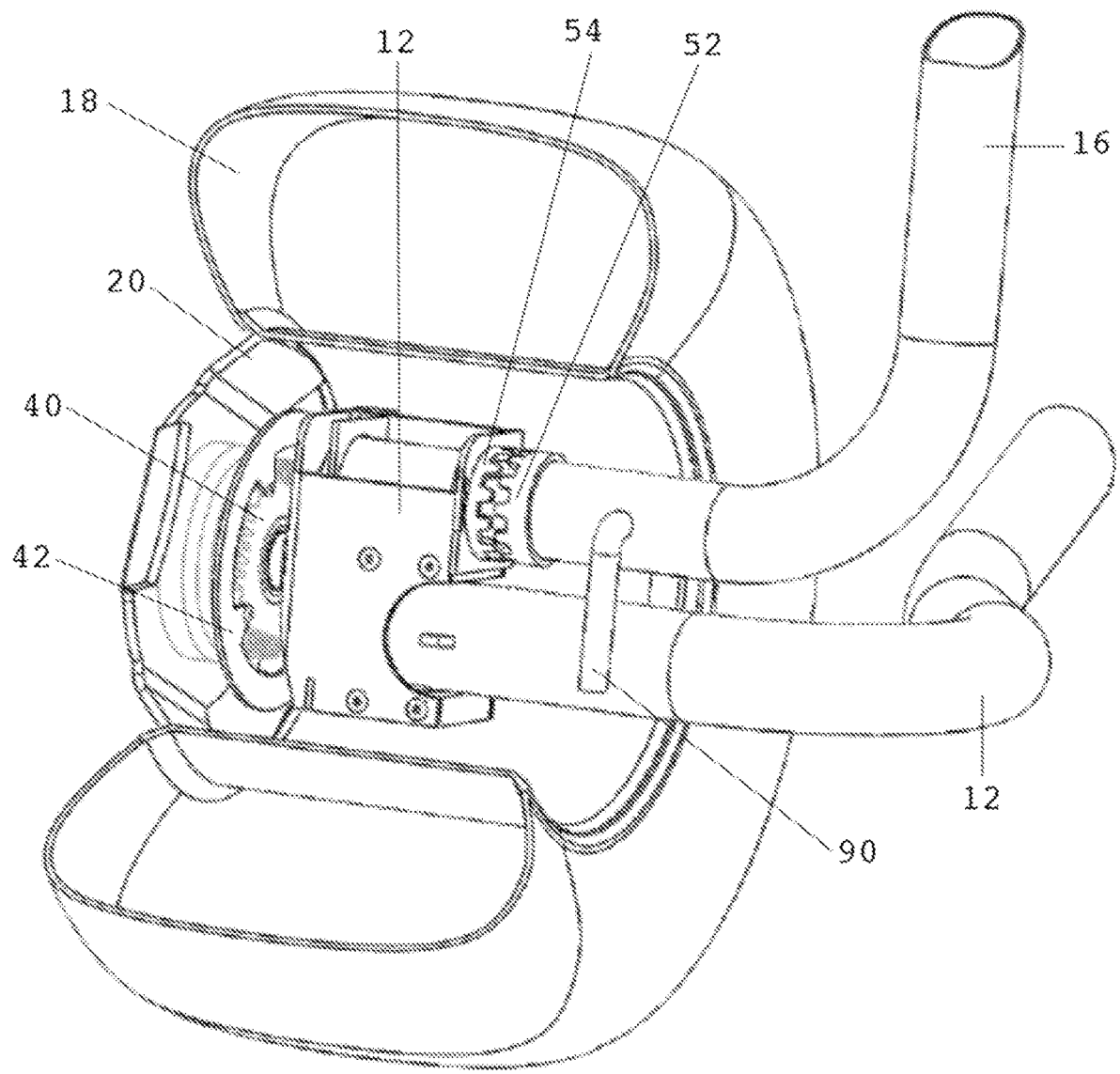
FIG. 7 depicts a perspective view of a front wheel of the Personal Transport Vehicle in accordance with an embodiment or portion of an embodiment of the present invention.
Figure 8:
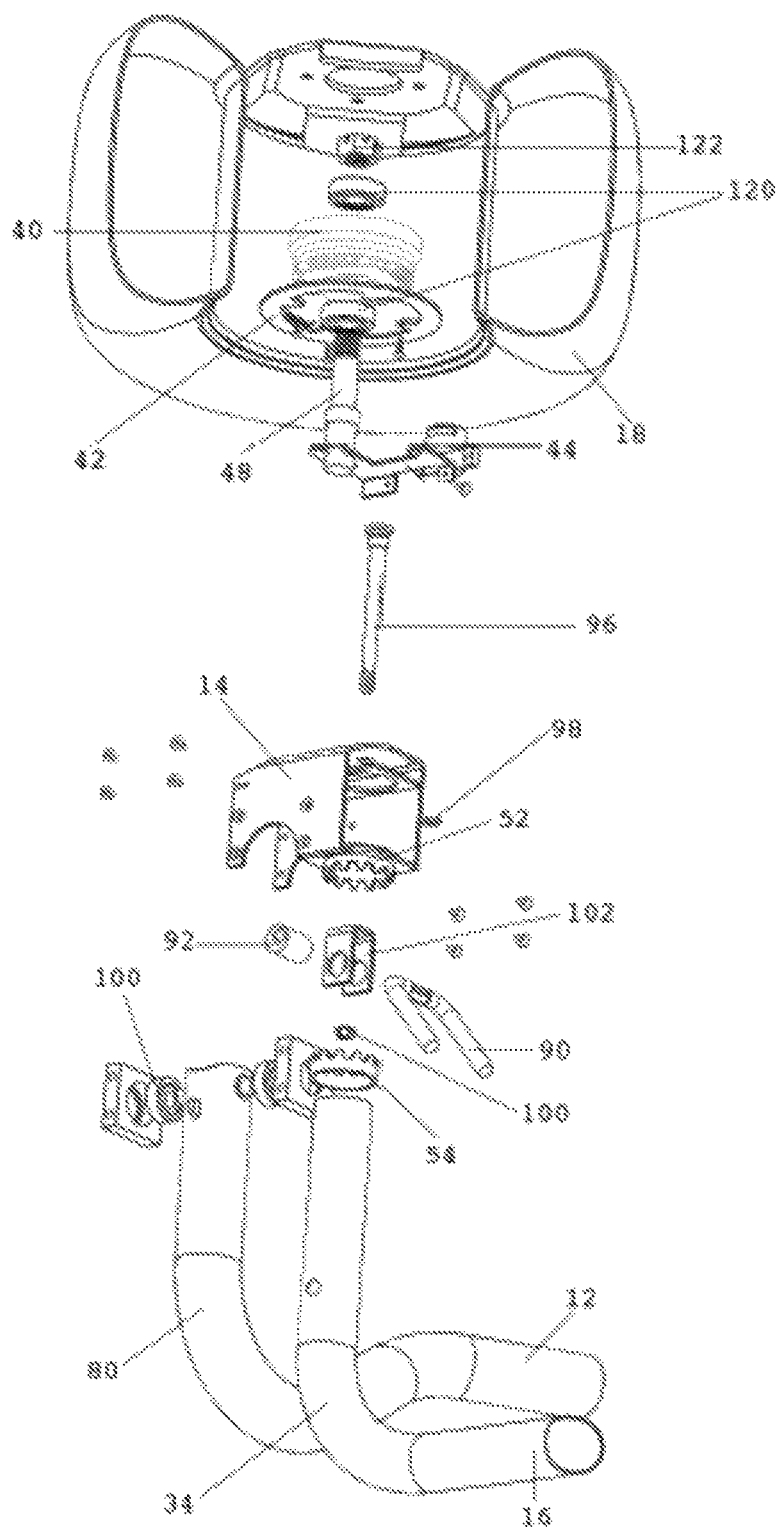
FIG. 8 depicts an exploded view of a front wheel of the Personal Transport Vehicle in accordance with an embodiment or portion of an embodiment of the present invention.

FIGS. 7 & 8 depict a perspective view of a front wheel 20 assembly of the Personal Transport Vehicle in accordance with an embodiment or portion of an embodiment of the present invention. In FIG. 7, the lever 90 is shown in the disengaged configuration. Furthermore FIGS. 7 & 8 provide an alternative pivot lock mechanism 50 for adjusting and locking the steering arm 16 in the desired position by the end user. The pivot lock mechanism 50 in FIGS. 7 & 8 comprises a lever 90 rotatably attached to the steering arm 16, for engaging and disengaging the keyseat 54 with the keyway 52. Dissimilar to the embodiment disclosed in FIGS. 5 & 6, both the keyway 52 is permanently affixed to the spindle 14, and the keyseat 54 is permanently affixed to the steering arm 16. Furthermore, the embodiment disclosed in FIGS. 7 & 8 does not require a collar 54a. Rather, the pivot lock mechanism 50 in FIGS. 7 & 8 incorporates an offset cam 92, which allows for movement of the steering arm 16 in the horizontal axes. The lever 90 is permanently attached to the offset cam 92, such that rotation of the lever 90 moves the steering arm 16 closer to and further away from the spindle 14. As the present keyway 52 and keyseat 54 are permanently affixed to their respective spindle 52 and steering arm 16, movement of the lever 90 allows for engagement and disengagement of the keyway 52 with the keyseat 54. Components of the mechanism 50 include a tension rod 96, a retaining ring 98 for ensuring the tension rod 96 remains in place, as well as a fastener 100 rotationally affixed to the end of the tension rod 96. The fastener 100 is rotationally attached to the tension rod 96 to allow for adjustment and tuning of the force required for engagement and disengagement of the lever 90. A bracket 102 is found within the steering arm 16, and provides the leverage necessary for engagement and disengagement of the keyway 52 with the keyseat 54. In various embodiments, the pivot lock mechanism 50 may have a stop mechanism, preferably on the surface of the offset cam 92, to signify optimal or maximum locking position of the offset cam 92.

Furthermore, the steering arm 16 may be limited in it's rotation of travel by one or more stops 94 located on the frame 12 of the vehicle 10. Limiting rotation may be helpful in avoiding rubbing of the vehicle tire 18 against the frame 12 or other component of the vehicle 10, while steering or otherwise operating the vehicle 10.

Figure 9:
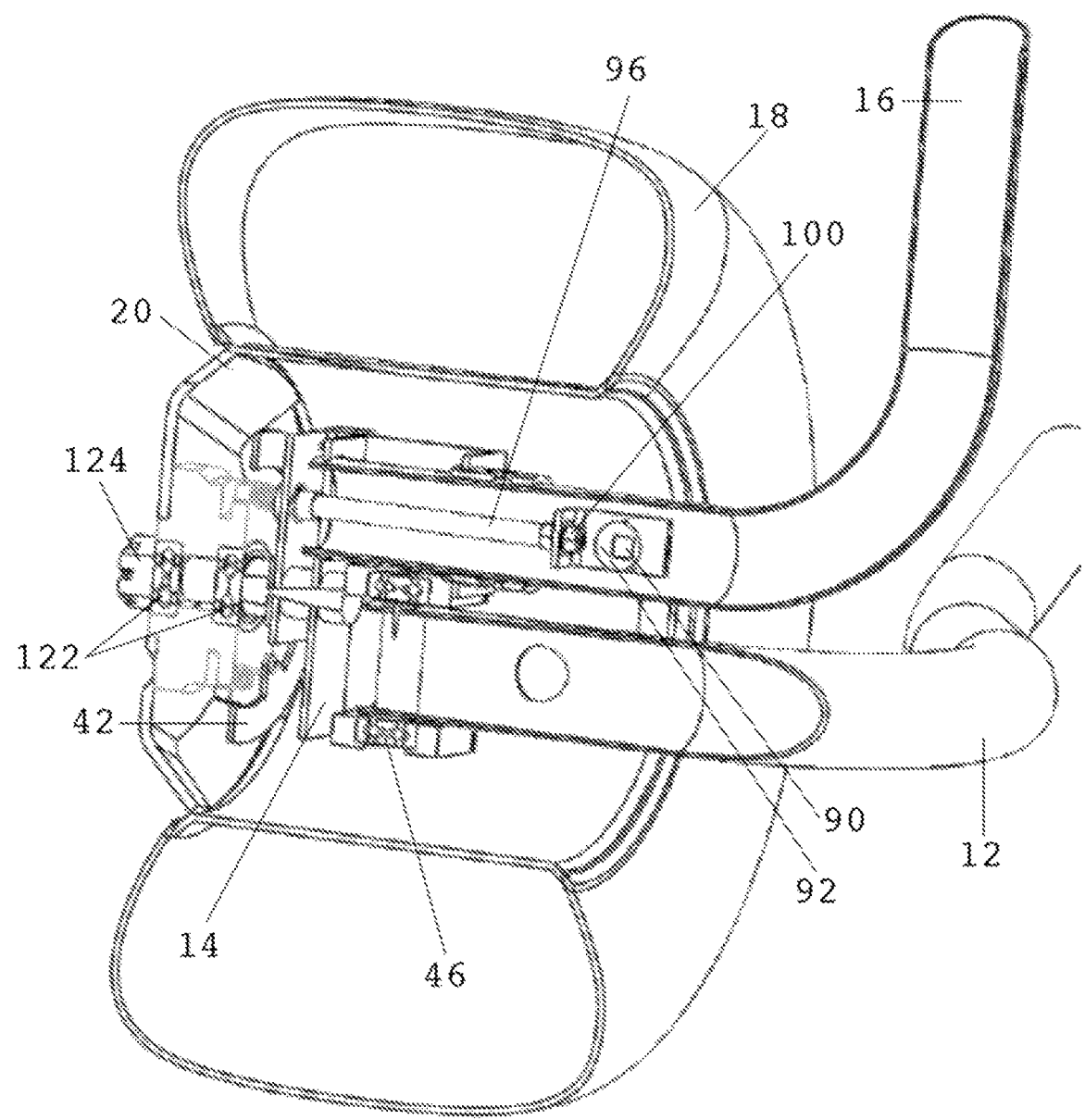
FIG. 9 depicts a dissected perspective view of a front wheel of the Personal Transport Vehicle in accordance with an embodiment or portion of an embodiment of the present invention.

FIG. 9 depicts a dissected perspective view of a front wheel 20 of the Personal Transport Vehicle 10 in accordance with an embodiment or portion of an embodiment of the present invention. Further depicted in FIG. 9 are the offset cam 92, shown as a cross section, as well as how the lever 90, engages with the offset cam 92 to accomplish engagement and disengagement of the keyway 52 with the keyseat 54. FIG. 9 further illustrates the cross-section of the front end 80 of the frame 12, spindle 14, and steering axle 46. Cross-sections of the upper nub 58 and lower nub 60 protruding from the frame 12, as well as engagement of the nubs 58, 60 with the upper and lower cavities 62 found in the spindle 14 are also provided. As stated earlier, the nubs 58, 60 and cavities 62 are configured and cooperate to allow for limited rotation of the spindle 14 about the axis created by the steering axle 46 (approximately vertical).

Figure 10:
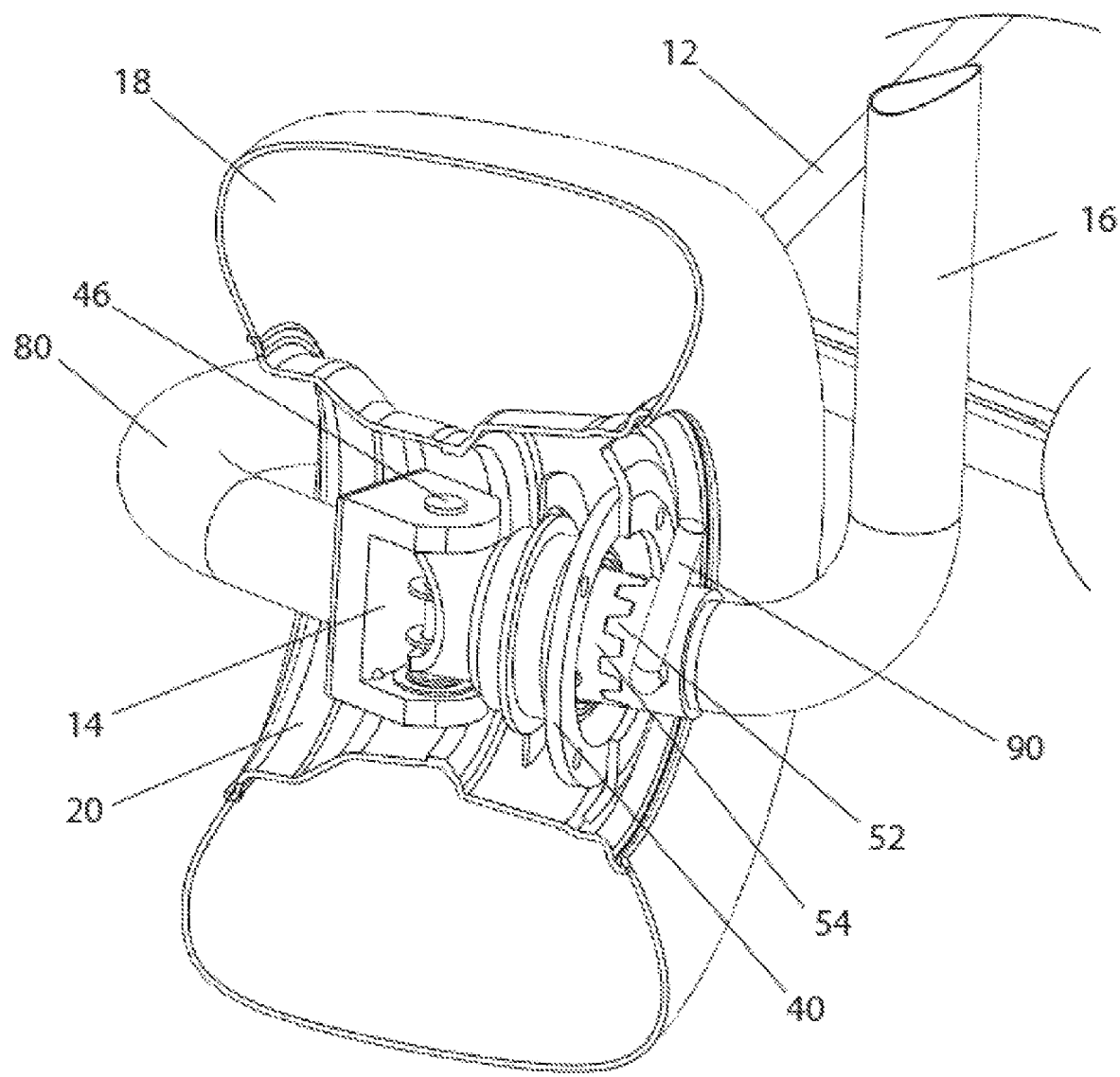
FIG. 10 depicts a perspective view of a front wheel of the Personal Transport Vehicle in accordance with an embodiment or portion of an embodiment of the present invention.
Figure 11:
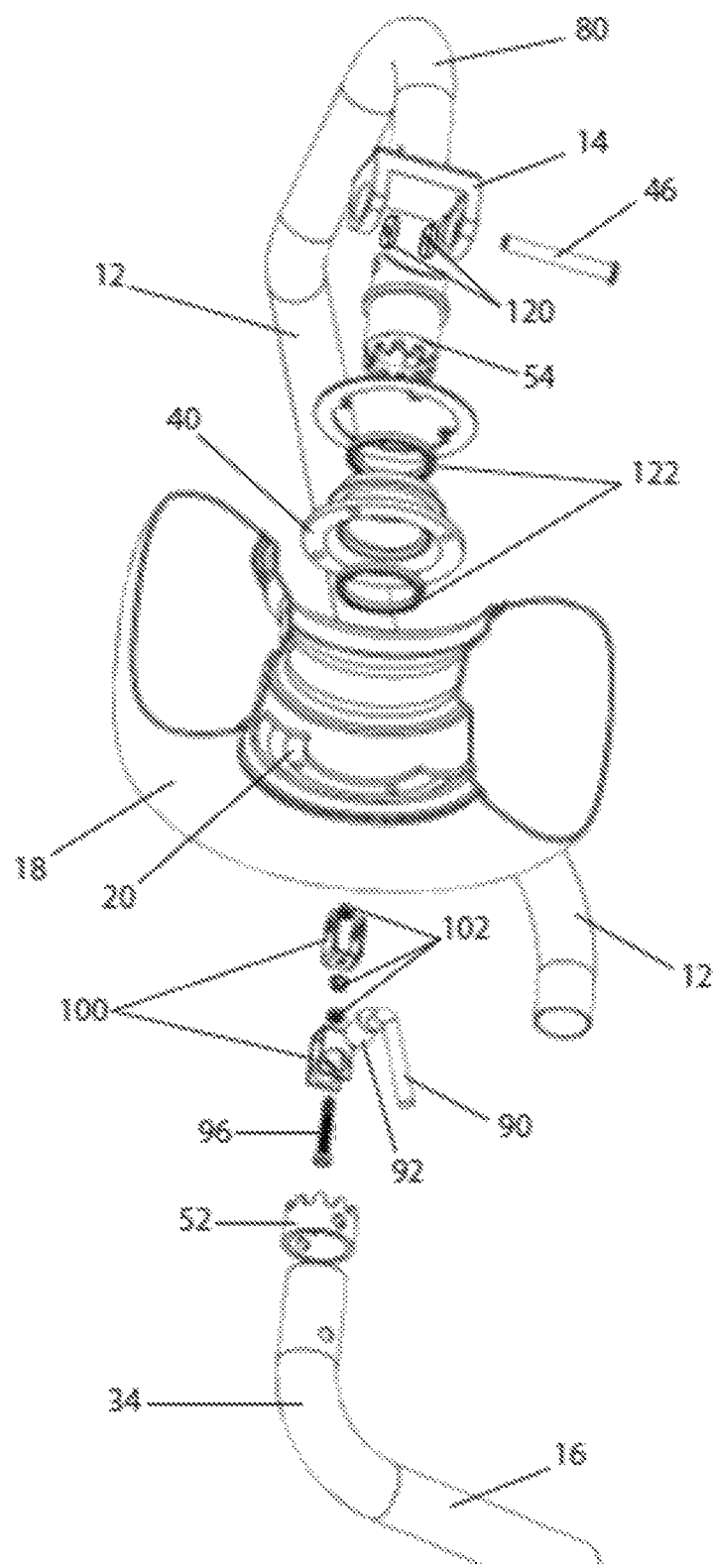
FIG. 11 depicts an exploded view of a front wheel of the Personal Transport Vehicle in accordance with an embodiment or portion of an embodiment of the present invention.

FIGS. 10 and 11 depict a perspective view of a front wheel of the Personal Transport Vehicle in accordance with an embodiment or portion of an embodiment of the present invention. In FIG. 10 an alternative embodiment of the frame 12 to steering arm 16 configuration is disclosed. As opposed to the embodiments seen previous, the front end 80 of the frame 12 engages the front wheel 20 and front hub 40 assembly on the opposite side as the proximal end 34 of the steering arm 16 engages the front wheel 20 and front hub 40. This 'through-wheel' configuration provides a slightly different spindle 14 design, as well as a wheel 20 that accommodates attachment of the frame 12 and steering arm 16 from opposing sides. Of significance is the altered pivot lock mechanism 50 which is specific for the 'through-wheel' configuration.

Figure 12:
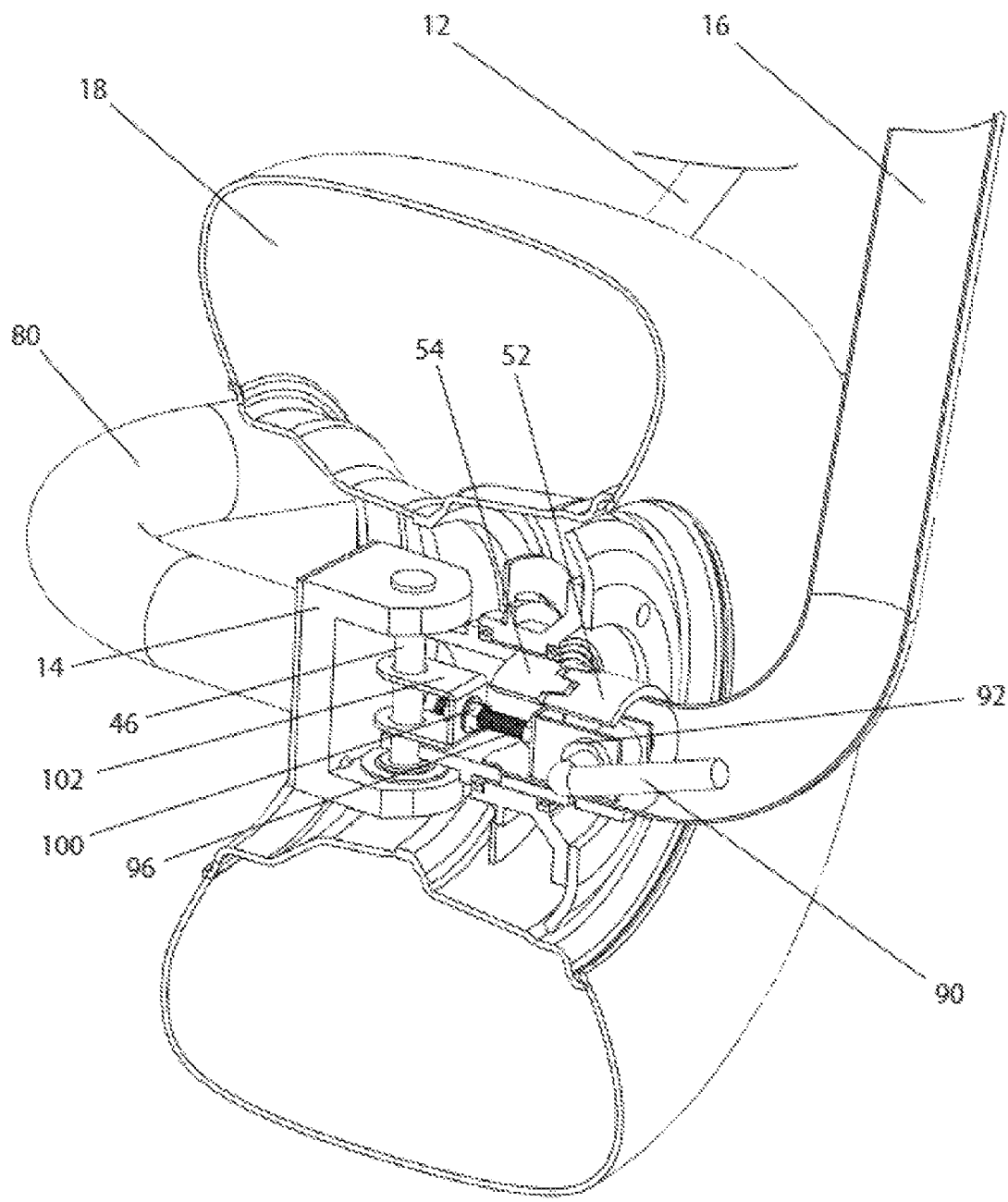
FIG. 12 depicts a dissected perspective view of a front wheel of the Personal Transport Vehicle in accordance with an embodiment or portion of an embodiment of the present invention.

FIG. 12 depicts a dissected perspective view of a front wheel of the Personal Transport Vehicle 10 in accordance with an embodiment or portion of an embodiment of the present invention.

Figure 13:
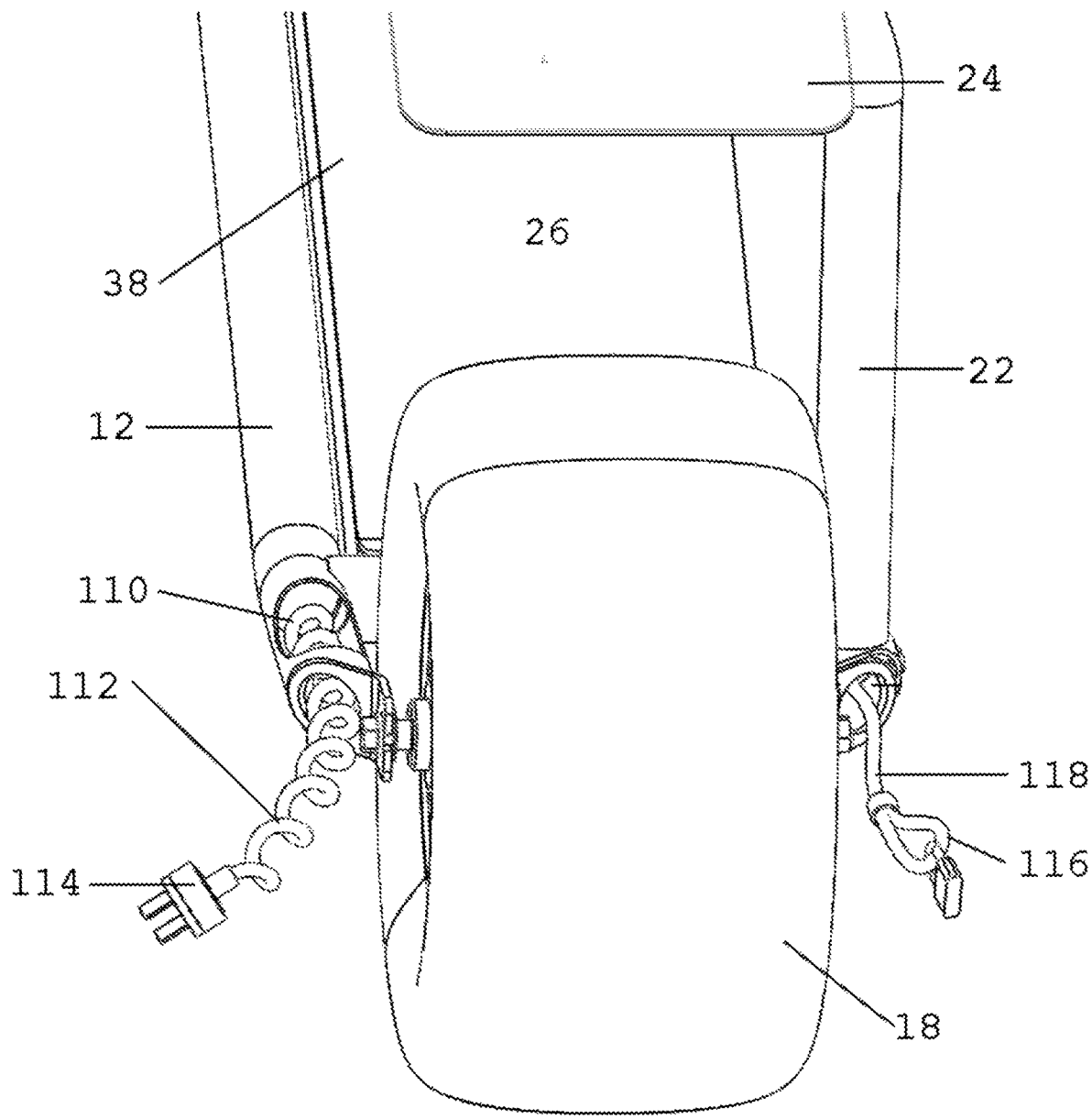
FIG. 13 depicts a rear perspective view of the Personal Transport Vehicle in accordance with an embodiment or portion of an embodiment of the present invention.

FIG. 13 depicts a rear perspective view of the Personal Transport Vehicle 10 in accordance with an embodiment or portion of an embodiment of the present invention. In particular FIG. 13 details the retractable power cord 110 in communication with the vehicles 10 optional power supply hidden displaced in the housing 38 of the vehicle 10. The power cord 110 utilizes the hollow tube chassis of the vehicle 10 to relay power lines 112 from the power supply (depicted as a battery) to a recharging source. The present embodiment depicts an NC plug 114 for recharging the power supply, however, alternative plugs and electronic connecting means are incorporated herein. FIG. 13 further details a theft-deterrent device 116 attached to the vehicle 10, wherein the theft-deterrent device comprises a cable or chain 118, with one end of the chain or cable 118 permanently affixed to the inner wall of the hollow tube chassis of the vehicle 10, and the opposing end of the cable or chain 118 capable of attaching to a bike a fixed object, such as a bike rack, fence, post, or other securable device.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A personal transport vehicle comprising:
a frame;
a front wheel coupled to the frame;
a rear wheel coupled to the frame; and
a steering assembly coupled to the front wheel within the front wheel, the steering assembly comprising:
a spindle disposed within the front wheel; and
a steering arm attached to the spindle within the front wheel;
wherein the spindle is rotatably attached to the frame within the front wheel; and
wherein the steering arm is configured for rotation in a generally vertical axis to move the front wheel for steering the personal transport vehicle.

2. The personal transport vehicle of claim 1, wherein the personal transport vehicle is self-balancing on the front wheel and rear wheel.

3. The personal transport vehicle of claim 1, further comprising a seat foldably attached to the frame.

4. The personal transport vehicle of claim 1, wherein the steering arm is attached to the spindle by a quick release pivot lock mechanism.

5. The personal transport vehicle of claim 1, further comprising at least one stop for limiting a range of the rotation of the steering arm with respect to the frame.

6. The personal transport vehicle of claim 1, further comprising an electric motor confined within the rear wheel.

7. The personal transport vehicle of claim 6, wherein the electric motor is actuated by a power system confined in the frame.

8. The personal transport vehicle of claim 7, further comprising a charging unit confined within the frame for charging the power system.

9. The personal transport vehicle of claim 1, further comprising a brake system affixed to the front wheel, the brake system comprising:
a brake disc;
a brake caliper; and
a brake pad.

10. The personal transport vehicle of claim 1, further comprising a theft deterrent device removably confined within the frame.

11. A personal transport vehicle comprising:
a frame;
a front wheel;
a rear wheel; and a steering arm;

wherein the frame is attached to both the front wheel and rear wheel on only one side of the wheel, such that an opposing side of the front wheel and an opposing side of the rear wheel are free from any structural support from the frame; and wherein the steering arm is attached to the opposing side of the front wheel.

12. The personal transport vehicle of claim 11, further comprising a steering assembly, the steering assembly comprising:

a spindle rotatably attached to the frame; and the steering arm;

wherein the steering arm is attached to the spindle, and wherein the steering arm is configured for rotation in a generally vertical axis to move the front wheel for steering the personal transport vehicle.

13. The personal transport vehicle of claim 11, wherein the personal transport vehicle is self-balancing on the front wheel and rear wheel.

14. The personal transport vehicle of claim 11, further comprising a seat foldably attached to the frame.

15. The personal transport vehicle of claim 11, wherein the steering arm is attached to the front wheel by a quick release pivot lock mechanism.

16. The personal transport vehicle of claim 11, further comprising at least one stop for limiting a range of rotation of the steering arm with respect to the frame.

17. The personal transport vehicle of claim 11, further comprising an electric motor confined within the rear wheel.

18. The personal transport vehicle of claim 17, wherein the motor is actuated by a power system confined in the frame.

19. The personal transport vehicle of claim 18, further comprising a charging unit confined within the frame for charging the power system.

20. The personal transport vehicle of claim 11, further comprising a brake system affixed to the front wheel, the brake system comprising:

a brake disc;

a brake caliper; and a brake pad.

21. A personal transport vehicle comprising:

a frame;

a front wheel coupled to the frame;

a rear wheel coupled to the frame;

a steering arm; and a seating arm;

wherein a center of gravity of the personal transport vehicle is substantially below a straight line connecting a centerline of the front wheel with a centerline of the rear wheel; and wherein the steering arm is configured to be folded to lay about parallel to the frame and the seating arm is configured to be folded to lay about parallel to the frame, such that in the folded configuration, vertical and horizontal parameters of the personal transport vehicle are created by the front wheel and the rear wheel.

* * * * *